United States Patent [19]

Kramer et al.

[11] Patent Number: 5,229,485
[45] Date of Patent: Jul. 20, 1993

[54] SOLUABLE POLYIMIDES

[75] Inventors: Andreas Kramer, Düdingen; Jean-Pierre Wolf, Courtaman; Rudolf Brunner, Belfaux, all of Switzerland

[73] Assignee: Ciga-Geigy Corporation, Ardsley, N.Y.

[21] Appl. No.: 766,467

[22] Filed: Sep. 26, 1991

[30] Foreign Application Priority Data

Oct. 2, 1990 [CH] Switzerland .................. 3209/90

[51] Int. Cl.$^5$ .................. C08G 69/26; C08G 73/10
[52] U.S. Cl. .................. 528/353; 528/125; 528/126; 528/128; 528/170; 528/172; 528/173; 528/185; 528/188; 528/220; 528/229; 528/352
[58] Field of Search .............. 528/353, 352, 172, 185, 528/188, 229, 128, 126, 125, 220, 170, 173

[56] References Cited

U.S. PATENT DOCUMENTS 4,418,181  11/1983  Monacelli .................. 528/125
4,629,777  12/1986  Pfeifer .................. 528/353

OTHER PUBLICATIONS

Polymer 30, 213 (1989).
33rd International SAMPE Symposium 1988, 1546.

Primary Examiner—John Kight, III
Assistant Examiner—P. Hampton-Hightower
Attorney, Agent, or Firm—JoAnn Villamizar; William A. Teoli, Jr.

[57] ABSTRACT

The invention relates to soluble homo- or copolyimides of formula I

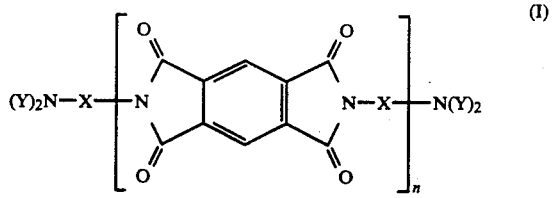

(I)

wherein Y is hydrogen or the substituents Y, together with the linking N atom, are a divalent radical of of formulae IIa to IIc

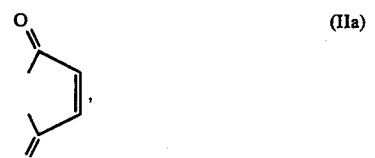

(IIa)

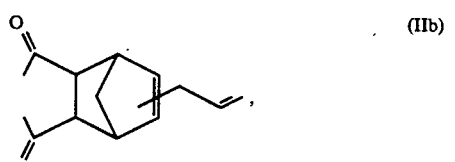

(IIb)

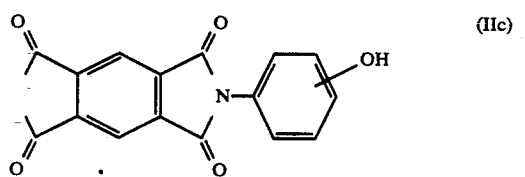

(IIc)

and X is the radical of of an aromatic amine after removal of the amino end groups, and n is an integer from 5 to 150.

The compounds of the invention are readily soluble in organic solvents and are suitable tougheners for epoxy, bismaleimide and triazine resin systems.

11 Claims, No Drawings

SOLUABLE POLYIMIDES

The present invention relates to novel soluble polyimides, to a process for their preparation and to the use thereof as tougheners in bismaleimide, epoxy and triazine resin systems.

Epoxy and bismaleimide resins are distinguished by outstanding high temperature capability, but have the disadvantage that they are rather brittle after curing. The use of a thermoplastic polyetherimide (Ultem ® 1000, General Electric) as toughener in epoxy resins is described in Polymer 30, 213 (1989). Polyether sulfones (Udel ® P 1700, UCC), polyetherimides (Ultem ® 1000, General Electric) and polyhydantoins (PH 10, Bayer) are used as tougheners for bismaleimide systems (33th Intern. SAMPE Symp. 1988, 1546), but they do not meet all requirements in respect of glass transition temperature, mechanical properties and compatibility with the base resin.

Polyimides of aromatic tetracarboxylic acids and aromatic diamines are disclosed in EP-A-315 216, but their use as tougheners for bismaleimide systems is limited by the rather high molecular weight. Polyetherimides (Ultem ® 1000, General Electric), polyether sulfones (Udel ® P 1700, UCC) and polyarylates (Ardel ® D100, Durel ® 400) are used as tougheners for triazine resin systems.

Specifically, the invention relates to soluble homo- or copolyimides of formula I

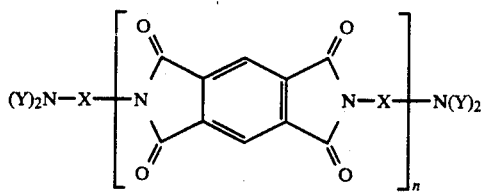

wherein Y is hydrogen or the substituents Y, together with the linking N atom, are a divalent radical of formulae IIa to IIc

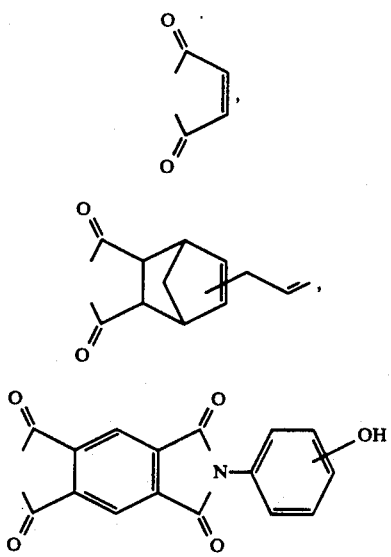

and X is a radical of formula IIIa and/or IIIb

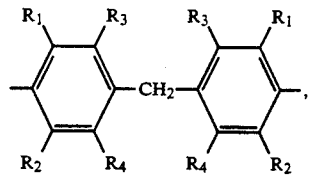

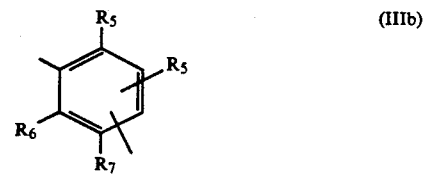

wherein $R_1$ is an alkyl, cycloalkyl, alkoxy, alkoxyalkyl or aralkyl group or, together with the radical at the adjacent C atom, forms an alkylene radical, $R_2$ is hydrogen or has one of the meanings given for $R_1$, $R_3$ and $R_4$ are each independently of the other hydrogen atoms or, together with $R_1$ or $R_2$, form an an alkylene radical, $R_5$ and $R_6$ are each independently of the other alkyl, cycloalkyl, alkoxy, alkoxyalkyl or aralkyl groups or, together with a radical at an adjacent C atom, form an alkylene radical, $R_7$ is hydrogen or has one of the meanings given for $R_5$ and $R_6$, and n is an integer from 5 to 150.

The substituents $R_1$, $R_2$, $R_5$, $R_6$ and $R_7$ may be linear or branched alkyl and alkoxy, each of 1 to 20, preferably 1 to 6 and, most preferably, 1 to 4, carbon atoms, linear or branched alkoxyalkyl of 2 to 12, preferably 2 to 6, carbon atoms, preferably alkoxymethyl, alkylene of 3 or 4 carbon atoms, cycloalkyl containing 5 to 8, preferably 5 or 6, ring carbon atoms, and aralkyl of 7 to 12 carbon atoms, preferably benzyl.

Such substituents are typically: methyl, ethyl, propyl, isopropyl, n-butyl, isobutyl, tert-butyl, pentyl, hexyl, octyl, dodecyl, tetradecyl, icosyl, cyclopentyl, cyclohexyl, methylcyclohexyl, methoxy, ethoxy, propoxy, butoxy, pentoxy, hexoxy, methoxymethyl, methoxyethyl, ethoxymethyl, propoxymethyl, butoxymethyl, benzyl, methylbenzyl, and phenylethyl. Preferred radicals are methoxymethyl, ethoxymethyl, methyl, ethyl, isopropyl, trimethylene and tetramethylene. Isopropyl, ethyl and especially methyl are particularly preferred.

In the polyimides of formula I, n is preferably an integer from 10 to 70.

Preferred copolyimides of formula I are those wherein the structural unit X consists of 20–80 mol % of a group of formula IIIa and 80–20 mol % of a group of formula IIIb.

$R_3$ and $R_4$ in the groups of formula IIIa are preferably hydrogen.

The radicals $R_1$ and $R_2$ in the groups IIIa are preferably ($C_1$–$C_6$)alkyl groups, more particularly methyl, ethyl, n-propyl or isopropyl groups.

Particularly preferred polyimides of formula I are those containing groups of formula IIIa, wherein $R_1$ is ethyl and $R_2$ is methyl and $R_3$ and $R_4$ are each hydrogen, or wherein $R_1$ is ethyl and $R_2$, $R_3$ and $R_4$ are each hydrogen.

In the groups of formula IIIb the free bonds are preferably in meta-position to one another, and $R_5$ is ethyl, $R_6$ is methyl and $R_7$ is hydrogen.

Also preferred are polyimides containing groups of formula IIIb, wherein the free bonds are in para-position to one another and $R_5$, $R_6$ and $R_7$ are each methyl.

Particularly preferred are groups of formula IIIb, wherein the free bonds are in meta-position and R₅ is ethyl, R₆ is methyl and R₇ is hydrogen.

The homo- or copolyimides of formula I are prepared by methods which are known per se, for example by reacting an aromatic diamine of formula IVa or IVb

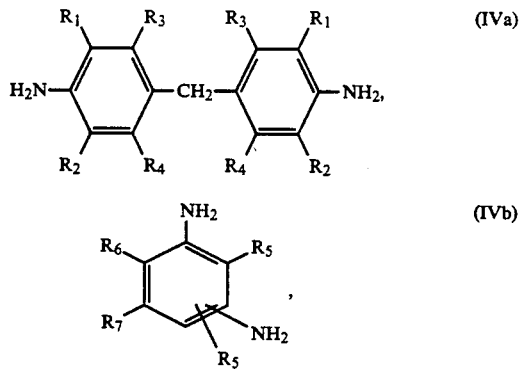

wherein the substituents R₁ to R₇ are as defined above, or a mixture of the diamines of formulae IVa and IVb, with pyromellitic dianhydride by itself or with a mixture of pyromellitic dianhydride and a compound selected from the group consisting of maleic anhydride, allylnadic anhydride and aminophenol, and subjecting the resultant polyamic acid to thermal imidisation by adding an entrainer.

The diamines of formulae IVa or IVb or the mixture of the diamines of formulae IVa and IVb are preferably used in about equimolar amounts, based on the pyromellitic dianhydride. In the preparation of polyimides of formula I containing NH₂ end groups, the expression "about equimolar amounts" will be understood as meaning a molar ratio of diamine of formula IVa or IVb or of the mixture of diamines of formula IVa and IVb to pyromellitic dianhydride of 1.3:1.0 to 1.01:1.0.

To prepare polyimides of formula I containing end groups —N(Y₂), wherein Y is a group of formula IIa or IIb, the diamines of formula IVa or IVb or the mixture of diamines of formula IVa and IVb and pyromellitic dianhydride are preferably used in the above ratio. In addition, 1 to 40 mol % (based on the diamine component) of maleic anhydride or allylnadic anhydride is added towards the end of the condensation.

To synthesise polyimides of formula I containing end groups —N(Y₂), wherein Y is a group of formula IIc, it is preferred to use a small excess of pyromellitic dianhydride (101 to 130 mol %), based on the diamine component or components. Towards the end of the condensation an additional 1 to 40 mol % (based on pyromellitic dianhydride) of aminophenol is added.

The polycondensation is preferably carried out in an aprotic polar solvent such as dimethyl sulfoxide, dimethyl formamide, dimethyl acetamide, diethyl acetamide and, preferably, N-methylpyrrolidone, and the polyamic acid is subjected to thermal imidisation by adding toluene, chlorobenzene or preferably, xylene as entrainer.

The diamines of formulae IVa and IVb are known and commercially available or they can be prepared by known methods.

Illustrative examples of diamines of formula IVa are: 3,3'-dimethyl-4,4'-diaminodiphenylmethane, 3,3'-diethyl-4,4'-diaminodiphenylmethane, 3,3'-diisopropyl-4,4'-diaminodiphenylmethane, 3,3',5,5'-tetramethyl-4,4'-diaminodiphenylmethane, 3,3',5,5'-tetraethyl-4,4'-diaminodiphenylmethane, 3,3'-diethyl-5,5'-dimethyl-4,4'-diaminodiphenylmethane, 3,3'-diisopropyl-5,5'-diethyl-4,4'-diaminodiphenylmethane, 3,3'-diisopropyl-5,5'diethyl-4,4'-diaminodiphenylmethane.

Illustrative examples of diamines of formula IVb are: 2,4,6-trimethyl-1,3-phenylenediamine, 2,4-diethyl-6-methyl-1,3-phenylenediamine, 5-ethyl-2,4-dimethyl-1,3-phenylenediamine, 2,4,5,6-tetramethyl-1,3-phenylenediamine, 2,4,6-triethyl-1,3-phenylenediamine, 2,3,6-trimethyl-1,4-phenylenediamine, 2,3-diethyl-6-methyl-1,4-phenylenediamine, 6-ethyl-2,3-dimethyl-1,4-phenylenediamine, 2,3,5,6-tetramethyl-1,4-phenylenediamine, 2,3,6-triethyl-1,4-phenylenediamine.

The novel polyimides containing reactive end groups have very high glass transition temperatures and are readily soluble in customary organic solvents, especially in halogenated hydrocarbons.

Owing to their excellent compatibility with epoxy, bismaleimide or triazine resin systems, the compounds of this invention are suitable for enhancing the toughness of these resins.

Accordingly, the invention also relates to compositions comprising
a) at least one epoxy, bismaleimide or triazine resin,
b) a hardener and/or curing catalyst for epoxy, bismaleimide or triazine resins, and
c) a polyimide of formula I.

Illustrative examples of epoxy resins are:

I) Polyglycidyl and poly(β-methylglycidyl) esters which are obtainable by reacting a compound containing at least two carboxyl groups in the molecule and epichlorohydrin or β-methyl epichlorohydrin. The reaction is conveniently carried out in the presence of a base.

Compounds containing at least two carboxyl groups in the molecule may suitably be aliphatic polycarboxylic acids. Exemplary of these polycarboxylic acids are glutaric acid, adipic acid, pimelic acid, suberic acid, azelaic acid, sebacic acid or dimerised or trimerised linoleic acid.

Cycloaliphatische polycarboxylic acids may also be used, for example tetrahydrophthalic acid, 4-methyltetrahydrophthalic acid, hexahydrophthalic acid or 4-methylhexahydrophthalic acid.

Aromatic polycarboxylic acids may also be used, for example phthalic acid, isophthalic acid or terephthalic acid.

II) Polyglycidyl or poly(β-methylglycidyl) ethers which are obtainable by reacting a compound containing at least two free alcoholic hydroxyl groups and/or phenolic hydroxyl groups in the molecule with epichlorohydrin or β-methylepichlorohydrin, under alkaline conditions or in the presence of an acid catalyst and subsequent treatment with an alkali.

Ethers of this type are derived, for example, from acyclic alcohols such as ethylene glycol, diethylene glycol and higher poly(oxyethylene) glycols, 1,2-propanediol, or poly(oxypropylene) glycols, 1,3-propanediol, 1,4-butanediol, poly(oxytetramethylene) glycols, 1,5-pentanediol, 1,6-hexanediol, 2,4,6-hexanetriol, glycerol, 1,1,1-trimethylolpropane, bis(trimethylol)propane, pentaerythritol, sorbitol, as well as from polyepichlorohydrins.

They are also derived, for example, from alcohols such as 1,4-cyclohexanedimethanol, bis(4-hydroxycyclohexyl)methane or 2,2-bis(4-hydroxycyclohexyl)propane, or they contain aromatic nuclei, such as N,N-bis(2-hydroxyethyl)aniline or p,p'-bis(2-hydroxyethylamino)diphenylmethane.

The epoxy compounds may also be derived from mononuclear phenols such as resorcinol or hydroquinone, or they are based on polynuclear phenols such as bis(4-hydroxyphenyl)methane, 2,2-bis(4-hydroxyphenyl)propane, 4,4'-dihydroxybiphenyl, bis(4-hydroxyphenyl)sulfone, 1,1,2,2-tetrakis(4-hydroxyphenyl)ethane, 2,2-bis(4-hydroxyphenyl)propane, 2,2-bis(3,5-dibromo-4-hydroxyphenyl)propane, as well as novolaks obtainable by condensation of aldehydes, such as formaldehyde, acetaldehyde, chloral or furfuraldehyde, with phenols, such as phenol, or with phenols which are substituted in the nucleus by chlorine atoms or $C_1$–$C_9$alkyl groups, for example 4-chlorophenol, 2-methylphenol or 4-tert-butylphenol, or by condensation with bisphenols, as described above.

III) Poly(N-glycidyl) compounds are obtainable, for example, by dehydrochlorination of the reaction products of epichlorohydrin with amines which contain at least two amino hydrogen atoms. These amines are typically aniline, n-butylamine, bis(4-aminophenyl)methane, m-xylylenediamine or bis(4-methylaminophenyl)methane.

The poly(N-glycidyl) compounds also include triglycidyl isocyanurate, N,N'-diglycidyl derivatives of cycloalkylene ureas such as ethyleneurea or 1,3-propyleneurea and diglycidyl derivatives of hydantoins, such as 5,5-dimethylhydantoin.

IV) Poly(S-glycidyl) compounds are typically bis-S-glycidyl derivatives which are derived from dithiols such as 1,2-ethanedithiol or bis(4-mercaptomethylphenyl) ether.

V) Cycloaliphatic epoxy resins such as bis(2,3-epoxycyclopentyl)ether, 2,3-epoxycyclopentylglycidyl ether, 1,2-bis(2,3-epoxycyclopentyloxy) ethane or 3,4-epoxycyclohexylmethyl-3',4'-epoxycyclohexanecarboxylate.

It is also possible, however, to use epoxy resins in which the 1,2-epoxy groups are attached to different hetero atoms or functional groups. These compounds comprise, for example, the N,N,O-triglycidyl derivative of 4-aminophenol, the glycidyl ether/glycidyl ester of salicylic acid, N-glycidyl-N'-(2-glycidyloxypropyl)-5,5-dimethylhydantoin or 2-glycidyloxy-1,3-bis(5,5-dimethyl-1-glycidylhydantoin-3-yl)propane.

It is preferred to use epoxy resins having an epoxy value of 2 to 10 eqivalents/kg which are glycidyl ethers, glycidyl esters or N-glycidyl derivatives of aromatic, heterocyclic, cycloaliphatic or aliphatic compounds. Particularly preferred epoxy resins are polyglycidyl ethers of polyhydric phenols, typically of 2,2-bis(4-hydroxyphenyl)propane (bisphenol A) or bis(4-hydroxyphenyl)methane (bisphenol F), or of novolaks.

The most preferred epoxy resins are diglycidyl ethers of bisphenol A, epoxycresol novolaks or 4,4'-diaminodiphenylmethane-tetraglycidyl derivatives.

Examples of bismaleimide resins are disclosed in, inter alia, DE-OS 2 267 045. The following compounds may be cited as specific examples of known bismaleimides suitable for the compositions of this invention: N,N'-ethylenebismaleimide, N,N'-hexamethylenebismaleimide, N,N'-trimethylhexylenebismaleimide, N,N'-m-phenylenebismaleimide, N,N'-4,4'-diphenylmethanebismaleimide, N,N'-4,4'-diphenyl ether bismaleimide, N,N'-(1,5,5-trimethylcyclohexyl-1,3-ene)bismaleimide, N,N-4,4'-dicyclohexylmethanebismaleimide, N,N'-p-xylylenebismaleimide, N,N'-4,4'-bis(2-ethyl-6-methylphenyl)methanebismaleimide, N,N'-4,4'-bis(2,6-dimethylphenyl)methanebismaleimide, N,N'-4,4'-bis(2,6-diethylphenyl)methanebismaleimide, N,N'-4,4'-bis(2,6-diisopropylphenyl)methanebismaleimide, N,N'-4,4'-bis(2-ethyl-6-isopropylphenyl)methanebismaleimide, N,N'-4,4'-bis(3-chloro-2,6-diethylphenyl)methanebismaleimide.

Methylene bis(phenylmaleimide) is especially preferred.

Exemplary of triazine resins are the polycyanurates disclosed, for example, in ACS Meeting, New York, April 1986, PMSE Preprints, pp. 107–113, or the melamineformaldehyde resins described in Makromol. Chem. 120, 68 (1968).

Exemplary of hardeners for epoxy resins are aliphatic, cycloaliphatic and heterocyclic amines such as bis(4-aminophenyl)methane, aniline-formaldehyde resins, bis(4-aminophenyl)sulfone, 1,3-propanediamine, hexamethylenediamine, diethylenetriamine, triethylenetetramine, 2,2,4-trimethyl-1,6-hexanediamine, m-xylylenediamine, bis(4-aminocyclohexyl)methane, 2,2-(4-aminocyclohexyl)propane, and 3-aminomethyl-3,5,5-trimethylcyclohexylamine (isophoronediamine); polyaminoamides, such as those obtained from aliphatic polyamines and dimerised or trimerised fatty acids; polyphenols, as resorcinol, hydroquinone, 2,2-bis(4-hydroxyphenyl)propane (bisphenol A) and phenol-aldehyde resins; polythiols, such as the polythiols commercially obtainable as "Thiokols ®"; polycarboxylic acids and their anhydrides, such as phthalic anhydride, tetrahydrophthalic anhydride, hexahydrophthalic anhydride, hexachloroendomethylenetetrahydrophthalic anhydride, pyromellitic dianhydride, benzophenone-3,3',4,4'-tetracarboxylic dianhydride, the acids of the anhydrides previously cited above as well as isophthalic acid and terephthalic acid. Catalytic hardeners can also be used, such as tertiary amines [e.g. 2,4,6-tris(dimethylaminoethyl)phenol]; imidazoles or Mannich bases; alkali metal alcoholates (e.g. the sodium alcoholate of 2,4-dihydroxy-3-hydroxymethylpentane); tin salts of alkanoic acids (e.g. tin octanoate); Friedel-Crafts catalysts such as boron trifluoride and boron trichloride and their complexes and chelates which are obtained by reacting boron trifluoride with 1,3-diketones; as well as amidines, preferably dicyandiamide.

Exemplary of curing catalysts for epoxy resins are tertiary amines, their salts or quaternary ammonium compounds such as benzyldimethylamine, 2,4,6-tris(dimethylaminomethyl)phenol, 1-methylimidazole, 2-ethyl-4-methylimidazole, 4-aminopyridine, tripentylammonium phenolate or tetramethylammonium chloride; or alkali metal alcoholates, such as the sodium alcoholate of 2,4-dihydroxy-3-hydroxymethylpentane; or substituted ureas such as N-(4-chlorophenyl)-N',N'-dimethylurea or N-(3-chloro-4-methylphenyl)-N',N'-dimethylurea (chlortoluron).

Hardeners for bismaleimide resins are the alkenyl phenols or alkenyl phenol ethers disclosed in DE-OS 2 627 045, such as o,o'-diallyl bisphenol A, o,o'-diallyl bisphenol F, 4,4'-dihydroxy-3,3'-diallyldiphenyl, bisphenol A diallyl ether, bisphenol F diallyl ether, 4,4'-diallyloxydiphenyl. The corresponding methallyl compounds can also be used. The preferred hardener is o,o'-diallyl bisphenol A.

Ionic and radical catalysts may be used as curing catalysts for bismaleimide resins. Particularly suitable ionic catalysts include tertiary, secondary or primary amines or amines which contain different types of amino groups (e.g. mixed tertiary-secondary amines) and quaternary ammonium compounds. These amine catalysts can be monoamines as well as polyamines. Monoamines will be preferred if primary and secondary amines are used. Typical examples of such amine catalysts are: diethylamine, tributylamine, triethylamine, triamylamine, benzylamine, tetramethyldiaminodiphenylmethane, N,N-diisobutylaminoacetonitrile, N,N-dibutylaminoacetonitrile, heterocyclic bases such as quinoline, N-methylpyrrolidine, imidazole, benzimidazole and their homologs or mercaptobenzothiazole. Exemplary of suitable quaternary ammonium compounds are benzyltrimethylammonium hydroxide and benzyltrimethylammonium methoxide. Further suitable ionic catalysts are alkali metal compounds such as alcoholates and hydroxides of alkali metals. Sodium methylate is particularly suitable. Suitable radical polymerisation catalysts are the known organic peroxides and hydrogen peroxides as well as azoisobutyronitrile. Further polymerisation catalysts are acetylacetonates, especially the acetylacetonates of transition metals.

The compositions of this invention preferably contain 1-50% by weight, preferably 5-30% by weight, of component c), based on component a).

After the cure, bismaleimide resins modified with the polyimides of the invention have very high glass transition temperatures and excellent ductility and fracture toughness. The mechanical properties of the resin are retained even where the concentration of polyimide is high (>10 parts per 100 parts of bismaleimide), and no detrimental phase separation occurs.

The invention is illustrated by the following Examples.

EXAMPLE 1

In a 4.5 liter sulfonation flask equipped with stirrer, thermometer, water separator, condenser and gas inlet pipe, 261.72 g (1.2 mol) of pyromellitic dianhydride are added in 4 portions at 5° C. over 1 hour to a solution of 247.1 g (0.875 mol) of 3,3'-diethyl-5,5'-dimethyl-4,4'-diaminodiphenylmethane and 66.86 g (0.375 mol) of 2,4-diethyl-6-methyl-1,3-phenylenediamine in 1.5 l of N-methylpyrrolidone (NMP). After 2 hours the ice-bath is removed and the reaction solution is stirred overnight at room temperature under nitrogen. To the reaction solution are added 750 ml of xylene, and water is removed as an azeotrope on the water separator under reflux. When the water separation is complete, the xylene is removed from the reactor by distillation and the still warm reaction solution is poured into 15 of water with vigorous stirring. The precipitate is isolated by filtration, mixed a second time in 5 of water, isolated by filtration and dried under vacuum at 100° C., affording 526 g (98%) of a yellow granulate which dissolves in methylene chloride to form a clear solution. The product has a molecular weight of 13 300 (number average $M_n$) and 35 380 (weight average $M_w$) determined by gel permeation chromatography (GPC) in tetrahydrofuran. The amine value (titration in phenol/chloroform with 0.1N HClO$_4$) is 0.19 meq/g. The glass transition temperature $T_g$, measured by differential scanning calorimetry (DSC), is 352° C.

EXAMPLE 2

In accordance with the general procedure described in Example 1, reaction of 176.5 g (0.625 mol) of 3,3'-diethyl-5,5'-dimethyl-4,4'-diaminodiphenylmethane, 111.43 g (0.625 mol) of 2,4-diethyl-6-methyl-1,3-phenylenediamine and 261.72 g (1.2 mol) of pyromellitic dianhydride gives 487 g (96%) of a yellow granulate which dissolves in methylene chloride to form a clear solution and has a molecular weight of 9060 (number average $M_n$) and 43 640 (weight average $M_w$) determined by GPC. The amine value (titration in phenol/chloroform with 0.1N HClO$_4$) is 0.24 meq./g.

EXAMPLE 3

In accordance with the general procedure described in Example 1, reaction of 222.72 g (0.875 mol) of 3,3'-diethyl-4,4'-diaminodiphenylmethane, 168.86 g (0.375 mol) of 2,4-diethyl-6-methyl-1,3-phenylenediamine and 261.72 g (1.2 mol) of pyromellitic dianhydride gives 501 g (98%) of a yellow granulate which dissolves in methylene chloride to form a clear solution and has a molecular weight of 11 100 (number average $M_n$) and 34 020 (weight average $M_w$) determined by GPC. The amine value (titration in phenol/chloroform with 0.1N HClO$_4$) is 0.23 meq/g.

EXAMPLE 4

In accordance with the general procedure described in Example 1, except that the product is precipitated in methanol instead of water, reaction of 247.1 g (0.875 mol) of 3,3'-diethyl-5,5'-dimethyl-4,4'-diaminodiphenylmethane, 66.86 g (0.375 mol) of 2,4-diethyl-6-methyl-1,3-phenylenediamine and 261.72 g (1.2 mol) of pyromellitic dianhydride gives 513 g (96%) of a yellow granulate which dissolves in methylene chloride to form a clear solution and has a molecular weight of $M_n = 14\ 260$ and $M_w = 45\ 710$ determined by GPC. The amine value (titration in phenol/chloroform with 0.1N HClO$_4$) is 0.165 meq/g.

EXAMPLE 5

In accordance with the general procedure described in Example 1, except that the product is precipitated in methanol instead of water, reaction of 221.43 g (0.784 mol) of 3,3'-diethyl-5,5'-dimethyl-4,4'-diaminodiphenylmethane, 59.9 g (0.336 mol) of 2,4-diethyl-6-methyl-1,3-phenylendiamine and 240 g (1.1 mol) of pyromellitic dianhydride gives 438 g (91%) of a yellow granulate which dissolves in methylene chloride to form a clear solution and has a molecular weight of $M_n = 24\ 570$ and $M_w = 93\ 460$ determined by GPC. The amine value (titration in phenol/chloroform with 0.1N HClO$_4$) is 0.08 meq/g.

EXAMPLE 6

In a 4.5 liter sulfonation flask equipped with stirrer, thermometer, water separator, condenser and gas inlet pipe, 261.72 g (1.2 mol) of pyromellitic dianhydride are added in 4 portions at 5° C. over 1 hour to a solution of 247.1 g (0.875 mol) of 3,3'-diethyl-5,5'-dimethyl-4,4'-diaminodiphenylmethane and 66.86 g (0.375 mol) of 2,4-diethyl-6-methyl-1,3-phenylenediamine in 1.5 of N-methylpyrrolidone (NMP). After 2 hours the ice-bath is removed and the reaction solution is stirred overnight at room temperature under nitrogen. To the reaction solution are added 750 ml of xylene, and water is removed as an azeotrope on the water separator under reflux. Towards the end of the water separation, 14.78 g (0.15 mol of maleic anhydride are added. When the water separation is complete, the xylene is removed from the reactor by distillation and the still warm reaction solution is poured into 15 l of water with vigorous stirring. The precipitate is isolated by filtration, mixed a second time in 5 l of water, isolated by filtration and dried under vacuum at 80° C., affording 504 g (94%) of a brownish granulate which dissolves in methylene chloride to form a clear solution and has a molecular weight of $M_n=11\,670$ and $M_w=42\,510$ determined by gel permeation chromatography (GPC) in tetrahydrofuran. Hydrogenation (in N,N-dimethylacetamide with Pd (10%) on carbon) gives a $H_2$ absorption of 0.2 mmol $H_2/g$.

EXAMPLE 7

In accordance with the general procedure described in Example 6, reaction of 247.1 g (0.875 mol) of 3,3'-diethyl-5,5'-dimethyl-4,4'-diaminodiphenylmethane, 66.86 g (0.375 mol) of 2,4-diethyl-6-methyl-1,3-phenylendiamine, 261.72 g (1.2 mol) of pyromellitic dianhydrid and 61.2 g (0.3 mol) of allylnadic anhydride (isomeric mixture of 1-allyl-5-norbornene-2,3-dicarboxylic anhydride and 5-allyl-5-norbornene-2,3-dicarboxylic anhydride) gives 550 g (96%) of a brownish granulate which dissolves in methylene chloride to form a clear solution and has a molecular weight of $M_n=9290$ and $M_w=34\,470$ determined by gel permeation chromatography (GPC). Hydrogenation (in N,N-dimethylacetamide with Pd (10%) on carbon) gives a $H_2$ absorption of 0.4 mmol $H_2/g$.

EXAMPLE 8

In accordance with the general procedure described in Example 6, reaction of 237.22 g (0.84 mol) of 3,3'-diethyl-5,5'-dimethyl-4,4'-diaminodiphenylmethane, 64.19 g (0.36 mol) of 2,4-diethyl-6-methyl-1,3-phenylendiamine, 272.63 g (1.25 mol) of pyromellitic dianhydrid and 10.91 g (0.1 mol) of 4-aminophenol gives 526 g (97%) of a yellow granulate which dissolves in methylene chloride to form a clear solution. The product has a molecular weight of $M_n=10\,140$ and $M_w=28\,500$. Determination of the phenolic OH groups is not possible because of the instability of the substance in the strongly alkaline range. By substraction of an insignificant amine residue it is possible to compute a phenol content of 0.12–0.14 meq/g.

USE EXAMPLES

EXAMPLE A 10 parts by weight of polyimide with an amine value of 0.19 meq/g (prepared according to Example 1) are added to a solution of 75 parts by weight of o,o'-diallyl bisphenol A in 100 ml of methylene chloride. The solvent is removed at 50°–100° C. by distillation, with stirring. Then 100 parts by weight of methylenebis(phenylmaleimide) are added at 100° C. and the mixture is fused at 130° C. Degassing is carried out briefly under vacuum and the resin mixture, which is readily castable at 130° C., is poured into a 4 mm thick metal mould. After the cure (1 h at 180° C., 2 h at 200° C. and 6 h at 250° C.), a brown transparent sheet is obtained.

EXAMPLE B

In accordance with the general procedure described in Example A, a sheet is prepared from 100 parts of methylenebis(phenylmaleimide), 75 parts of o,o'-diallyl bisphenol A and 20 parts of polyimide with an amine value of 0.08 meq/g (prepared according to Example 5).

EXAMPLE C

In accordance with the general procedure described in Example A, a sheet is prepared from 100 parts of methylenebis(phenylmaleimide), 75 parts of o,o'-diallyl bisphenol A and 20 parts of polyimide containing maleimide end groups (prepared according to Example 6).

EXAMPLE D

In accordance with the general procedure described in Example A, a sheet is prepared from 100 parts of methylenebis(phenylmaleimide), 75 parts of o,o'-diallyl bisphenol A and 30 parts of polyimide containing allylnadimide end groups (prepared according to Example 7).

EXAMPLE E

In accordance with the general procedure described in Example A, a sheet is prepared from 100 parts of methylenebis(phenylmaleimide), 75 parts of o,o'-diallyl bisphenol A and 20 parts of polyimide containing phenol end groups (prepared according to Example 8).

The polymer properties of the sheets prepared in the foregoing Examples are indicated in Table 1.

TABLE 1

| Example | A | B | C | D | E |
|---|---|---|---|---|---|
| glass transition temperature $T_g$ (TMA)/°C. | 316 | 310 | 305 | 305 | 310 |
| flexural strength (ISO 178)/MPa | 182 | 158 | 164 | 159 | 154 |
| edge fibre elongation (ISO 178)/% | 6.59 | 5.06 | 5.40 | 5.20 | 4.83 |
| flexural strength (ASTM E 399–789)/J/$m^2$ | 223 | 311 | 230 | 223 | 273 |

EXAMPLE F 20 parts by weight of polyimide with an amine value of 0.19 meq/g (prepared according to Example 1) are added to a solution of 100 parts by weight of bis(4-hydroxyphenyl)methanediglycidyl ether in 100 ml of methylene chloride. The solvent is removed at 50°–100° C. by distillation, with stirring. Then 38 parts by weight of 4,4'-diaminodiphenylsulfone are added at 100° C. and the mixture is fused at 120° C. Degassing is carried out briefly under vacuum and the resin mixture, which is readily castable at 120° C., is poured into a 4 mm thick metal mould. After the cure (2 h at 160° C., 2 h at 180° C.) a orange transparent sheet is obtained.

EXAMPLE G

In accordance with the general procedure described in Example F, a sheet is prepared from 100 parts of bis(4-hydroxyphenyl)methanediglycidyl ether, 36 parts by weight of 4,4'-diaminodiphenylsulfone and 10 parts by weight of polyimide with an amine value of 0.08 meq/g (prepared according to Example 5).

The polymer properties of the sheets prepared according to Examples F and G are indicated in Table 2.

TABLE 2

| Example | F | G |
|---|---|---|
| glass transition temperature $T_g$ (TMA)/°C. | 181 | 180 |
| flexural strength (ISO 178)/MPa | 160 | 157 |
| edge fibre elongation (ISO 178)/% | 9.1 | 8.95 |

TABLE 2-continued

| Example | F | G |
|---|---|---|
| flexural strength (ASTM E 399–789)/J/m² | 238 | 210 |

What is claimed is:

1. A homo- or copolyimide of formula I

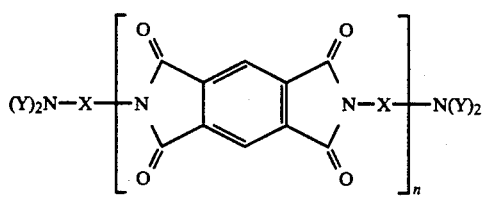

wherein Y is hydrogen or the substituents Y, together with the linking N atom, are a divalent radical of formulae IIb to IIc

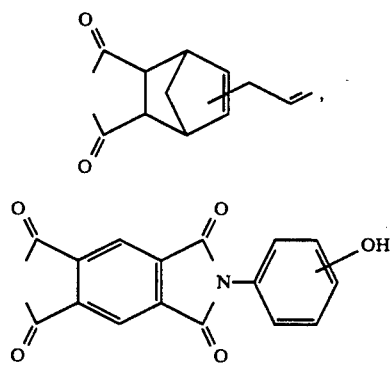

and each X is independently a radical of formula IIIa or IIIb

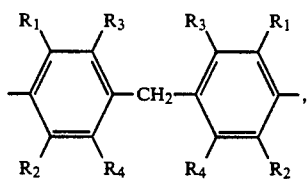

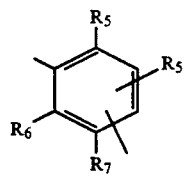

wherein $R_1$ is an alkyl, cycloalkyl, alkoxy, alkoxyalkyl or aralkyl group or, together with the radical at the adjacent C atom, forms an alkylene radical, $R_2$ is hydrogen or has one of the meanings given for $R_1$, $R_3$ and $R_4$ are each independently of the other hydrogen atoms or, together with $R_1$ or $R_2$, form an alkylene radical, $R_5$ and $R_6$ are each independently of the other alkyl, cycloalkyl, alkoxy, alkoxyalkyl or aralkyl groups or, together with a radical at an adjacent C atom, form an alkylene radical, $R_7$ is hydrogen or has one of the meanings given for $R_5$ and $R_6$, n is an integer from 5 to 150.

2. A polyimide according to claim 1, wherein n is an integer from 10 to 70.

3. A copolyimide according to claim 1, wherein the structural unit X consists of 20–80 mol % of a group of formula IIIa and 80–20 mol % of a group of formula IIIb.

4. A polyimide according to claim 1, wherein $R_1$ and $R_2$ are each independently of the other $C_1$–$C_6$alkyl groups, preferably methyl, ethyl, n-propyl or isopropyl groups, and $R_3$ and $R_4$ are each hydrogen.

5. A polyimide according to claim 1, wherein $R_1$ is ethyl and $R_2$ is methyl and $R_3$ and $R_4$ are each hydrogen.

6. A polyamide according to claim 1, wherein $R_1$ is ethyl and $R_2$, $R_3$ and $R_4$ are each hydrogen.

7. A polyimide according to claim 1, wherein $R_5$ and $R_6$ are each independently of the other $C_1$–$C_6$alkyl groups, preferably methyl, ethyl, n-propyl or isopropyl groups.

8. A polyimide according to claim 1, wherein the free bonds in the group of formula IIIb are in meta-position to one another.

9. A polyimide according to claim 8, wherein $R_5$ is ethyl, $R_6$ is methyl and $R_7$ is hydrogen.

10. A polyimide according to claim 1, wherein the free bonds in the group of formula IIIb are in para-position to one another and $R_5$, $R_6$ and $R_7$ are each methyl.

11. A process for the preparation of a homo- or copolyimide of formula I as claimed in claim 1, which comprises reacting an aromatic diamine of formula IVa or IVb

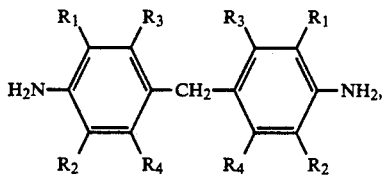

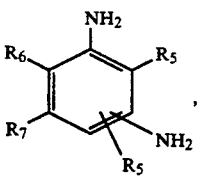

wherein the substituents $R_1$ to $R_7$ are as defined in claim 1, or a mixture of the diamines of formulae IVa and IVb, with pyromellitic dianhydride or with a mixture of pyromellitic dianhydride and a compound selected from the group consisting of allylnadic anhydride and aminophenol, and subjecting the resultant polyamic acid to thermal imidisation by adding an entrainer.

* * * * *